May 28, 1963 G. B. JOHNSTONE 3,091,477
TROLLEYS, BOGIES AND THE LIKE FOR FACILITATING
THE HANDLING AND MOVEMENT OF ARTICLES
AND PARTICULARLY HEAVY ARTICLES
Filed Oct. 24, 1960 5 Sheets-Sheet 1

FIG. 2.A

INVENTOR:
GEORGE B. JOHNSTONE
BY
*Munill & Smiley*
ATTYS.

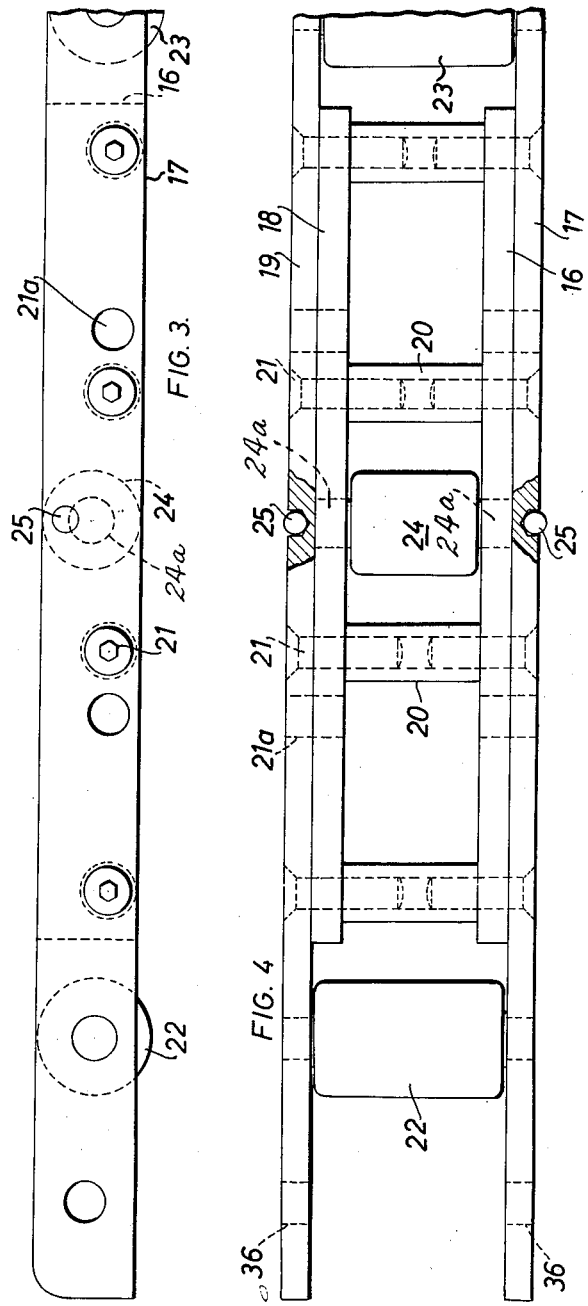

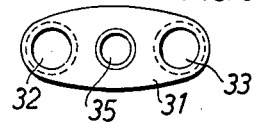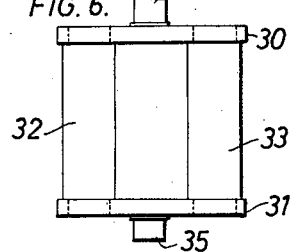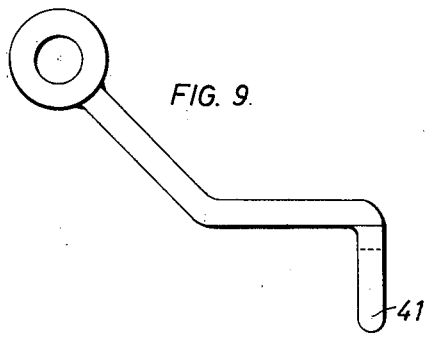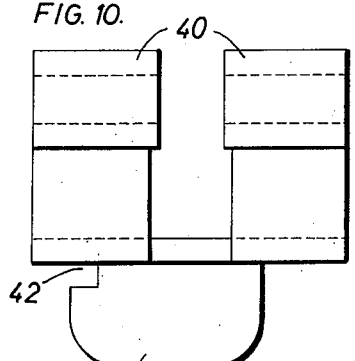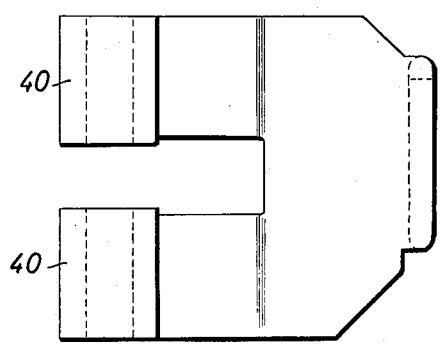

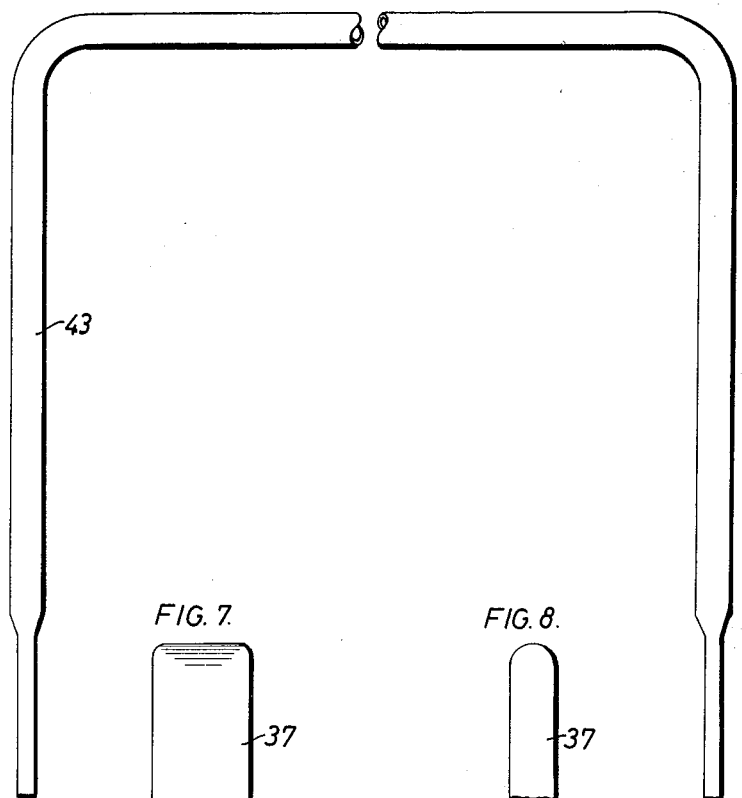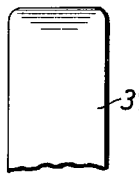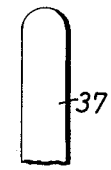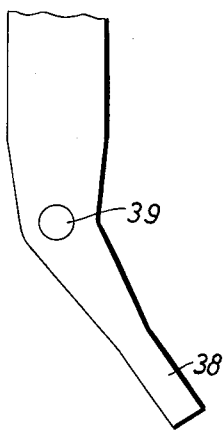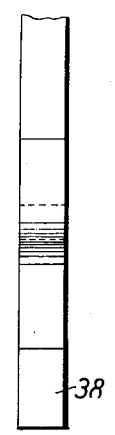

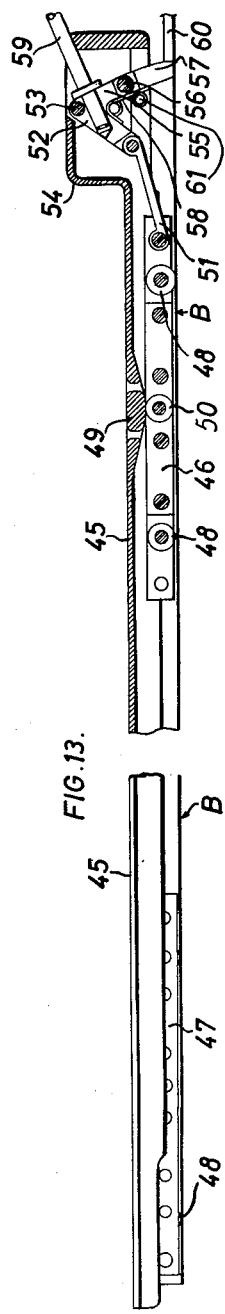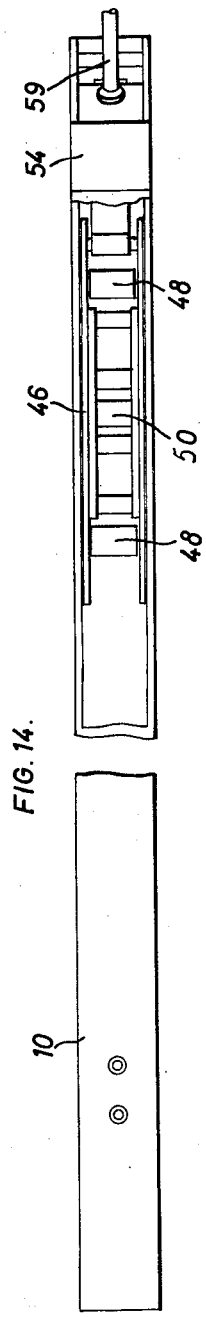

United States Patent Office 3,091,477
Patented May 28, 1963

3,091,477
TROLLEYS, BOGIES AND THE LIKE FOR FACILITATING THE HANDLING AND MOVEMENT OF ARTICLES AND PARTICULARLY HEAVY ARTICLES
George B. Johnstone, 16 Tudor Road, Hunt's Cross, Woolton, Liverpool, England
Filed Oct. 24, 1960, Ser. No. 64,407
Claims priority, application Great Britain Dec. 24, 1959
3 Claims. (Cl. 280—46)

This invention is for improvements in or relating to trolleys, bogies and the like (hereinafter referred to as trolleys) for facilitating the handling and movement of articles and particularly heavy articles and loads.

Figure 1A:
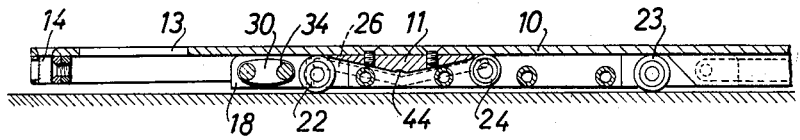
Figure 1B:
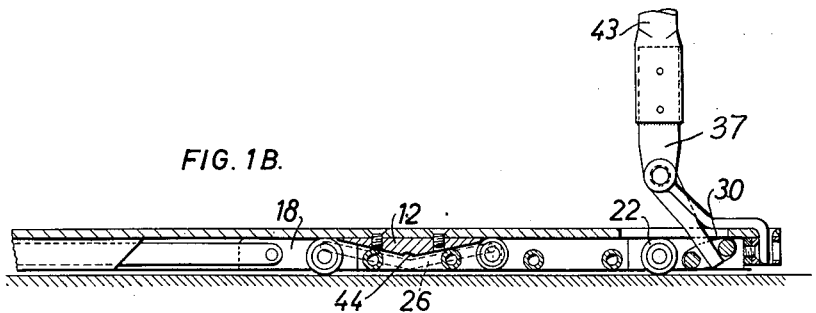
Figure 2B:
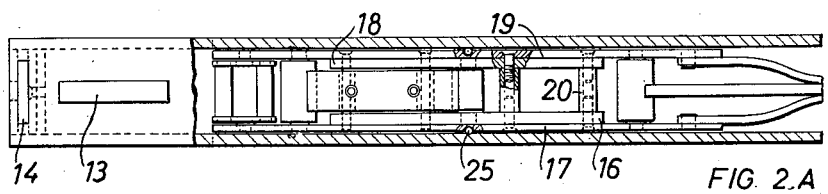
Figure 2B:
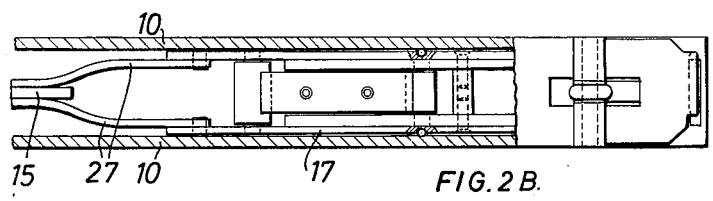

One particular embodiment of the invention will now be described, by way of example, with reference to the accompanying drawings wherein:

FIGURES 1A and 1B show the left and right hand ends of the trolley in longitudinal sectional elevation, FIGURES 2A and 2B are sectional plan views of FIGURES 1A and 1B, FIGURE 3 is a detail side elevation of one of the bogies, FIGURE 4 is a plan view of one of the bogies, FIGURES 5 and 6 are a side elevation and plan view respectively of a socket element embodied in the bogie and adapted for engagement by the bogie-actuating lever, FIGURES 7 and 8 are a side elevation and end elevation respectively of the bogie-actuating lever, FIGURES 9, 10 and 11 are, respectively, a side elevation, end elevation and plan view of a supporting bracket for the lever shown in FIGURES 7 and 8, FIGURE 12 shows an operating handle for a pair of the levers shown in FIGURES 7 and 8 where two trolleys are arranged for simultaneous operation in side-by-side relationship, FIGURE 13 is a sectional elevation of a modification, and FIGURE 14 is a plan view of FIGURE 13.

Referring to FIGURES 1 to 12 of the drawings, the trolley comprises an outer inverted channel-section body 10, of spring steel, having secured on the underside of its web, in spaced apart relationship, two double ramps or wedges 11 and 12 of spring steel. Each end of the channel-section body 10 is slotted longitudinally as indicated at 13 and transversely as indicated at 14 for a purpose hereinafter to be described. The spring steel body 10 is strengthened by means of an internal longitudinal web 15.

Two bogies B1 and B2 are housed in longitudinally spaced relationship, i.e. in tandem, within the inverted channel-section body 10. Each of these bogies comprises (see more particularly FIGURES 3 and 4) spring steel side members, one of said side members consisting of plates 16 and 17 and the other of plates 18 and 19. The plates 16 and 17 are secured together by screws 21 as are also the plates 18 and 19. The screws 21 screw into tubular members 20 so that the side members are connected together in spaced relationship. Dowels are provided at 21a to relieve the screws of sheer stresses. The side frame plates 17 and 19 support between them, on needle roller assemblies (not shown), the bogie rollers or wheels 22 and 23 on which the trolley runs. The side frame plates 16 and 18 support between them, clear of the ground, a roller 24, said roller having journals 24a which are supported for rotation in bearing apertures in the side plates 16 and 18. In the case of the bogie B1, its roller 24 is adapted to engage the inclined faces of the ramp 11 and in the case of the bogie B2, its roller 24 is adapted to engage in the inclined faces of the inverted ramp 12.

To retain the inverted channel-section body 10 on the bogies and at the same time allow the body 10 to rise and fall relatively to the bogies the latter are provided with steel balls 25 which are trapped in recesses in the side frame members 17 and 19 and project into inclined grooves 26 in the inside faces of the flanges of the body 10.

The two bogies are coupled together by means of links 27 and 28 pivotally connected to the bogies as indicated at 29.

The socket shown in FIGURES 5 and 6 which is adapted for engagement by the bogie-actuating lever, i.e. the lever which moves the bogies longitudinally of the body 10 as hereinafter described, comprises cheek-plates 30 and 31 between which extend a pair of pins 32 and 33, the pin 32 being provided with a flat as indicated at 34 in FIGURE 1A. The cheeks 30 and 31 have trunnions 35 which are journalled in holes 36 in the side frame members 17 and 19 of the bogie.

The lever shown in FIGURES 7 and 8 has a shank part 37 and a tongue part 38 between which there is a pivoting hole 39 adapted to receive a pivot pin which is secured in the sockets 40 of the bracket shown in FIGURES 9, 10 and 11. This bracket has a tongue part 41 which is slotted as indicated at 42 and is adapted to be inserted in the slot 14 in hte body 10, the slot 42 releasably locking the bracket in position. The tongue 38 of the lever projects through the slot 13 of the body part 10 and between the pins 32 and 33 as shown on the right-hand side of FIGURES 1A and 2A.

The shank 37 of the lever 37, 38 (see FIGURES 1B and 7, 8 and 12) is provided with a long handle 43.

Where two trolleys are secured together in side-by-side relationship which will usually be the case so as to provide a complete trolley, the handle 43 may conveniently be of "pram handle" form as shown in FIGURE 12, the extremities of the two limbs of the handle being flattened so that they can be pushed onto the shanks of the levers 37, 38.

Assuming a load to be moved by the trolley is resting on battens somewhat clear of the ground, the trolley is run under the load and the handle 43 is then pulled rearwardly. This serves to move the bogies longitudinally relatively to the body 10 and the rollers 24 engage under the ramps 11 and 12 and raise the body 10 so as to lift the load off its supporting battens. The load can then be run from place to place on the trolley.

The ramps 11 and 12 may have a recess or "flat" 44 which, when the body part 10 is fully elevated, rests on the rollers 24 so as to maintain the body part 10 steady on the bogies until it is required to lower the load which can be done by effecting a reverse movement of the bogies relatively to the body part 10 by the aid of the lever 43.

The side flanges of the inverted channel-section body part 10 may be deepened so that in the lowermost position of the body part the edges of these flanges rest on the ground and serve as a brake for the trolley.

It will be appreciated that not only is the trolley useful in raising a load from its supports but it can also be used to lower a load onto suitable supports after which the trolley can readily be run from under the load by lowering the body part 10 with respect to the bogies.

By providing two or more bogies linked together within the outer channel-section body part the trolley can accommodate itself to, and run easily over, undulating ground or over a floor or rail or rails of an uneven nature.

Two or more trolleys as above described may be connected together side by side so as to form a mobile platform or frame which spans, for example, the floor of a transport vehicle or vessel. If such vehicle is provided with side channels such as is sometimes done for drainage purposes, then conveniently the wheels of the trolleys are adapted to run in said side channels. In other cases, of course, the trolley or a parallel arrangement of trolleys may be associated with a rail or rails on which they are adapted to run. The two or more trolleys may be connected together by cross-members or by a floor or platform.

Instead of the bogies being moved longitudinally in the outer channel or body part to raise or lower the latter, the arrangement may be reversed, i.e. the body part may be arranged to move longitudinally of the bogie or bogies so as to effect this lifting and lowering action. Alternatively the body part and the bogie or bogies may be arranged to move longitudinally relatively to each other, one in one direction and one in the other, so that this combined movement effects the required raising and lowering of the trolley to pick up or take the weight of a load and transport it from place to place.

A latch device may be provided for locking the handle in the position to which it is moved to raise or lower the load supporting surface of the trolley.

One or more bogies or trolleys as above described may be built into the base of a machine tool, article of furniture, refrigerator or other article so as to facilitate the movement thereof from place to place.

By providing a double wedge or ramp or a pair of opposed wedges or ramps, operation of the trolley or bogie can be effected from either end thereof, the operating handle being transferred from one end to the other as required.

Conveniently the wedge or ramp is of spring steel, as is also the body 10 and other desirable parts of the trolley.

The construction may be such that the trolley or bogie is self-starting, the impetus or momentum afforded by actuating its handle to raise it so as to lift the load also serving to start the trolley along the path it is desired to traverse. This path may, for example, be, as stated above, in a rail of channel set in, for example, the floor or deck of a motor vehicle, ship or the like. Similarly the load itself as its weight is taken on the trolley may be caused to give a starting impetus to the trolley or bogie.

The construction may be such that it provides a "dead man's handle" effect by which the trolley is braked automatically when the handle is released.

A stop plate or the like may be provided in or on or adjacent one or both ends of the trackway for the trolley or bogie, this stop means being adapted to engage, for example, the side frame of the bogie so that when said side frames strike the stop plate the bogie so that when said side frames strike the stop plate the bogie will be halted or actuated to render it immobile. The flanges of the channel-section body part at one or both ends, where the trolley is adapted to be operated from both ends, are cut away slightly so that they will clear this stop plate.

The relative movement to raise the body part may be transverse with respect to the trolley.

The bogie may have skids instead of or in addition to wheels or rollers.

In the above described construction the ramps are of double form so that the trolley is operable from either end, the recesses 44 in the ramps being capable of overriding the rollers 24 as required so as to bring one or other side of the ramps into operative relationship with the rollers 24. The arrangement also enables braking to take place in either direction as required.

The low overall height of the trolley enables it to run in channels below floor level when in the lowered position. This in many cases avoids the use of pallets.

The lever-mounting arrangement 13, 14 may be replaced by various alternative arrangements. For instance, a bracket similar to the bracket shown in FIGURES 9, 10 and 11 may be permanently secured to one or both ends of the trolley.

A sprag or ratchet mechanism, which may be arranged to operate automatically, may be provided for controlling or braking the impetus or self-starting of the trolley. This sprag or ratchet mechanism may be arranged to operate, for example, on the trolley rollers or wheels or between the trolley and the floor or ground.

The trolley shown in FIGURES 13 and 14 of the drawings comprises an inverted channel-section member 45 which houses two bogies 46 and 47 which will generally be linked together in tandem. The bogies have wheels or rollers 48.

The web of the channel-section member 45 has on its underside a double wedge, ramp or inclined plane device 49 adapted to be engaged by a roller 50 on the bogie 46. A similar ramp and roller arrangement is provided for the bogie 47.

The bogie 46 is coupled by a link 51 to an arm 52 of a bellcrank lever pivoted at 53 in a housing 54 provided at one end of the member 45.

The bellcrank lever has a limb 55 to which is hinged at 56 an extension 57 acted upon by a spring 58.

The trolley is designed in this particular example to run in a channel-section track and the part 57 is designed to move in this track so as to keep it clear. The base of the track is indicated at B. This track may, for example, be set in the floor of a motor vehicle for carrying heavy loads.

The bellcrank lever 52, 55 is provided with a socket or other means adapted to receive or engage with one end of a hand lever 59 by which the trolley is actuated, controlled and moved from place to place.

In FIGURE 13 the trolley is shown in the position it occupies when it is operative to move a load from one place to another. To bring the trolley to this condition the hand lever 59 has been moved downwardly so as to bring the roller 50 under the hump or peak of the double wedge 49. This has the effect of raising the load engaging member 45 relatively to the bogies. As a result the load is taken up by the trolley, which has previously been run under the load, and can be moved from place to place.

There may, of course, be two or more trolleys as just described arranged in side-by-side relationship so as to support, for example, a load bearing pallet between them. The two trolleys may be connected together by crossrods or bars inserted through holes in the channel member 10 or in the housing 54 thereon.

When the trolley reaches the end of its track the extension 57 of the bellcrank lever comes up against a stop 60. Due to its momentum the member 45 tends to move on and an abutment 61 on it comes up against the leg formed by the limb 55 and extension 57 so as to collapse or fold it, against the action of the spring 58 and allow the member 45 to lower and the trolley to come relatively gently to a stop.

With the trolley in the condition shown in FIGURE 13, if the wedge 49 is permitted, by easing pressure on the handle 59, to run slightly down the roller 40 it will tend to make the trolley run on its wheels or rollers 48. Thus, gravity represented by the weight of the load on the trolley, can be utilised to assist movement of the trolley and in particular to overcome the starting inertia of the trolley.

Instead of operating the trolley by means of a handle, or in addition to providing a handle, the operating means may constitute a pedal.

I claim:

1. A trolley apparatus comprising at least one bogie, a trackway for said bogie, a load-carrying platform mounted on said bogie for longitudinal movement relatively thereto, a roller carried by the bogie, an inverted ramp on the underside of said load-carrying platform and resting on said roller, means retaining the load-carrying platform on the bogie and for guiding said relative longitudinal movement, a manual control lever, a pivot on the load-carrying platform for said control lever, an operative connection between said lever and the bogie for effecting said relative longitudinal movement between the bogie and the load-carrying platform, said relative longitudinal movement being translated by said roller and ramp into a vertical movement of the carriage relative to the bogie and an impetus to movement of the trolley on its bogie under the control of said control lever, a leg, a pivotal support on the load-carrying member for said leg, an operative connection between said leg and the bogie and a stop at the end of the bogie trackway positioned so as to be engaged by said leg whereby the latter is caused to effect said relative movement between the bogie and load-carrying platform to lower said platform and bring the trolley to rest.

2. A trolley comprising at least one bogie, a trackway for said bogie, a load-carrying platform mounted on said bogie for longitudinal movement relatively thereto, a roller carried by the bogie, an inverted ramp on the underside of said load-carrying platform and resting on said roller, means retaining the load-carrying platform on the bogie and for guiding said relative longitudinal movement, a bellcrank lever, a pivot on the load-carrying platform for said lever, a link operatively connecting one arm of said bellcrank lever to the bogie, a hand-lever, means securing said hand-lever to said bellcrank lever whereby movement of the hand-lever effects said relative longitudinal movement between the bogie and the load-carrying platform, said relative longitudinal movement being translated by said roller and ramp into a vertical movement of the carriage relative to the bogie and an impetus to movement of the trolley on its bogie under the control of said control lever, a collapsible leg having a pivotal support on the other arm of said bellcrank lever, a spring acting to prevent collapse of said leg, a stop at the end of the trackway positioned so as to be engaged by said leg, and an abutment on the load-carrying platform positioned so as to engage said leg and collapse it against the action of said spring when the load-carrying platform, due to its momentum, moves longitudinally relatively to the bogie when said leg engages said stop, whereby the trolley is brought gently to rest.

3. A trolley apparatus comprising at least two bogies, a trackway for said bogies, means coupling said bogies together in tandem, a load-carrying platform of inverted channel-section located over said bogies for guided longitudinal movement relatively thereto, a roller carried by each bogie, an inverted double ramp device having oppositely inclined surfaces for each such roller on the underside of said load-carrying member and resting freely and floatingly on its associated roller, each ramp having a part at the junction of its inclined surfaces to provide a stable rest position for said ramp on its roller, a bellcrank lever, a pivot on and towards one end of the load-carrying platform for said lever, a link operatively connecting one arm of said bellcrank lever to the bogie at that end of the load-carrying platform, a hand lever, means securing said hand lever to said bellcrank lever whereby movement of the hand-lever effects said longitudinal movement between the load-carrying platform and the bogies, said relative movement being translated by said rollers and ramps into a vertical movement of the load-carrying platform relative to the bogies and an impetus to movement of the trolley on its bogies under the control of said control lever, a collapsible leg having a pivotal support on the other arm of said bellcrank lever, a spring acting to prevent collapse of said leg, a stop at the end of the trackway positioned so as to be engaged by said leg, and an abutment on the load-carrying platform positioned so as to engage said leg and collapse it against the action of said spring when the load-carrying platform, due to its momentum, moves longitudinally relatively to the bogies when said leg engages said stop, whereby the trolley is brought gently to rest.

References Cited in the file of this patent

UNITED STATES PATENTS

| | | |
|---|---|---|
| 165,965 | West | July 27, 1875 |
| 827,966 | Flake | Aug. 7, 1906 |
| 1,129,775 | Anthony | Feb. 23, 1915 |
| 1,230,278 | Chesnutt | June 19, 1917 |
| 1,857,468 | McGinness | May 10, 1932 |
| 2,319,581 | Brownlee et al. | May 18, 1943 |
| 2,624,590 | Tilton | Jan. 6, 1953 |
| 2,638,354 | Larson et al. | May 12, 1953 |
| 2,643,894 | Schroeder | June 30, 1953 |
| 2,855,209 | Hull | Oct. 7, 1958 |

FOREIGN PATENTS

| | | |
|---|---|---|
| 91,724 | Norway | May 19, 1958 |